US012005464B2

(12) United States Patent
Duffin et al.

(10) Patent No.: US 12,005,464 B2
(45) Date of Patent: Jun. 11, 2024

(54) SPRINKLER WITH RADIALLY LIMITED NUTATING SPOOL ASSEMBLY

(71) Applicant: XCAD VALVE & IRRIGATION, INC., Paul, ID (US)

(72) Inventors: Don Duffin, Paul, ID (US); Roger Duffin, Paul, ID (US); Casey Nutt, Paul, ID (US)

(73) Assignee: XCAD Valve and Irrigation, Inc., Paul, ID (US)

( * ) Notice: Subject to any disclaimer, the term of this patent is extended or adjusted under 35 U.S.C. 154(b) by 0 days.

(21) Appl. No.: 17/088,405

(22) Filed: Nov. 3, 2020

(65) Prior Publication Data

US 2021/0276026 A1 Sep. 9, 2021

Related U.S. Application Data

(63) Continuation-in-part of application No. 16/813,598, filed on Mar. 9, 2020, now Pat. No. 10,857,551.

(51) Int. Cl.
*B05B 3/00* (2006.01)
*B05B 3/04* (2006.01)

(52) U.S. Cl.
CPC .................................... *B05B 3/008* (2013.01)

(58) Field of Classification Search
CPC .............................. B05B 3/008; B05B 3/0486
USPC ..................................................... 239/222.17
See application file for complete search history.

(56) References Cited

U.S. PATENT DOCUMENTS

| | | | | | |
|---|---|---|---|---|---|
| 2,848,276 | A * | 8/1958 | Clearman | B05B 3/0486 | 239/280 |
| 4,221,338 | A * | 9/1980 | Shames | E03C 1/084 | 239/449 |
| 5,439,174 | A * | 8/1995 | Sweet | B05B 3/0486 | 239/71 |
| 5,588,595 | A * | 12/1996 | Sweet | B05B 3/0486 | 239/222.11 |
| 6,341,733 | B1 * | 1/2002 | Sweet | B05B 3/0486 | 239/381 |
| 6,360,965 | B1 * | 3/2002 | Clearman | B05B 3/0486 | 239/443 |
| 6,439,477 | B1 * | 8/2002 | Sweet | B05B 3/008 | 239/231 |
| 7,287,710 | B1 * | 10/2007 | Nelson | B05B 3/0486 | 239/222.17 |
| 7,552,877 | B2 * | 6/2009 | Grant | B05B 3/0486 | 239/389 |
| 7,942,345 | B2 * | 5/2011 | Sesser | B05B 3/0486 | 239/524 |

(Continued)

*Primary Examiner* — Joseph A Greenlund
(74) *Attorney, Agent, or Firm* — Scott D. Swanson; Shaver Swanson

(57) ABSTRACT

A sprinkler head having a spool assembly positioned within the lower sprinkler body of the sprinkler head. The spool assembly has a spool body having a distribution disc at an upper end of the spool body. The sprinkler head is configured with a nozzle that sprays fluid onto the distribution disk, causing the spool assembly to nutate within the lower sprinkler body when sprinkler head is running. The spool assembly is configured with two friction bands that are each configured to radially roll in or on a respective race within the lower sprinkler body. The friction bands can be integrally formed with the spool assembly or removably positioned on the spool assembly.

12 Claims, 15 Drawing Sheets

(56) References Cited

U.S. PATENT DOCUMENTS

| | | | | |
|---|---|---|---|---|
| 8,028,932 | B2 * | 10/2011 | Sesser | B05B 3/008 239/524 |
| 8,584,969 | B2 * | 11/2013 | Drechsel | B05B 3/0486 239/222 |
| 8,925,838 | B2 * | 1/2015 | Drechsel | B05B 3/0486 239/442 |
| 8,991,724 | B2 * | 3/2015 | Sesser | B05B 3/005 239/524 |
| 10,710,103 | B2 * | 7/2020 | Lawyer | B05B 1/265 |
| 10,828,653 | B2 * | 11/2020 | Healy | B05B 3/0486 |
| 10,857,551 | B1 * | 12/2020 | Duffin | B05B 3/008 |
| 2006/0249594 | A1 * | 11/2006 | Pinch | B05B 3/0486 239/233 |
| 2008/0017732 | A1 * | 1/2008 | Perkins | B05B 3/006 239/222.11 |
| 2010/0038450 | A1 * | 2/2010 | Sesser | B05B 3/0486 239/222.17 |
| 2010/0252654 | A1 * | 10/2010 | Sesser | B05B 3/008 239/222.17 |
| 2011/0155827 | A1 * | 6/2011 | Drechsel | B05B 3/008 239/589 |
| 2013/0327846 | A1 * | 12/2013 | Sesser | B05B 3/005 239/252 |
| 2014/0312143 | A1 * | 10/2014 | Duffin | B05B 3/008 239/233 |
| 2015/0115066 | A1 * | 4/2015 | Drechsel | B05B 1/265 239/518 |
| 2017/0120265 | A1 * | 5/2017 | Duffin | B05B 3/0481 |
| 2018/0311684 | A1 * | 11/2018 | Lawyer | B05B 1/265 |
| 2019/0054480 | A1 * | 2/2019 | Sesser | B05B 15/14 |
| 2019/0054481 | A1 * | 2/2019 | Sesser | B05B 3/003 |
| 2019/0336991 | A1 * | 11/2019 | Duffin | B05B 3/008 |
| 2020/0047195 | A1 * | 2/2020 | Healy | B05B 3/0463 |
| 2021/0220849 | A1 * | 7/2021 | Healy | B05B 3/008 |

* cited by examiner

SPRINKLER WITH RADIALLY LIMITED NUTATING SPOOL ASSEMBLY

PRIORITY/CROSS-REFERENCE TO RELATED APPLICATIONS

This application claims the benefit of U.S. Non-Provisional application Ser. No. 16/813,598, filed Mar. 9, 2020, the disclosure of which is incorporated by reference.

TECHNICAL FIELD

The herein disclosed and claimed inventive concepts generally relate to a sprinkler head, and more particularly to a nutating sprinkler head for randomizing fluid distribution.

BACKGROUND

Irrigation systems such as center pivot systems have a structure from which down tubes are suspended, with sprinkler heads attached to the down tubes. The sprinkler heads may also be mounted on top of the rotating structures of the center pivot systems, or on upward turned ends of the down tubes. Such sprinkler heads can operate in any orientation, because the force of the fluid stream is greater than the force of gravity on the lightweight sprinkler parts. However, for convenience the sprinkler head and its parts are described as being in the orientation as shown in the figures, with "upper", "lower", "top", and "bottom" surfaces applied to the sprinkler parts in the orientation shown in the figures.

These sprinkler heads take a number of different forms and all try to create a uniform and random spread of fluid droplets, or a size which does not result in excessive evaporation. One common type of sprinkler head utilizes a distribution pad connected to a floating cage or spool and is configured to nutate in order to randomly distribute fluid. Clearman educates in U.S. Pat. No. 2,848,276 that a "wobble disc surrounds the neck and is free to move up and down between the upper annular surface formed by the top end of [the] stand and the lower annular surface" and that "the annular surfaces [upper] and [lower] limit movement of [the] wobble disc." Most nutating sprinkler heads utilizing a nutating cage incorporate this same "wobble disc" loading vertically on upper and lower annular surfaces as seen in U.S. Pat. Nos. 3,312,400; 4,773,594; 5,381,960; 5,950,927; 6,176,440; 7,070,122; 7,287,710; and 7,562,833; or inversely, use upper and lower annular surfaces on a spool loading vertically on a disc or disc as seen in U.S. Pat. Nos. 7,287,710; 7,562,833; 7,942,345; and 8,028,932.

Due to the geometry of these annular surfaces being designed to be limited vertically, they must be relatively close together when compared to the diameter of the annular surfaces. This causes the center of rotation of the nutating cage assembly to be near one end of the cage assembly and not near the center of mass of the cage assembly. This can result in excessive vibration in the sprinkler head and can damage the irrigation equipment to which the sprinklers are attached. Thus many ways of mounting this type of sprinkler head have been developed to isolate this vibration, as seen is U.S. Pat. Nos. 4,795,100; 4,949,905; and 5,333,796. Alternatively, sprinklers have been developed with a counterbalance to minimize vibration. However, existing counterbalancing mechanisms typically either have large, exposed moving bodies as seen in U.S. Pat. No. 7,070,122, or require additional enclosures to protect the moving counterbalance as seen in U.S. Patent Pub. No. 2019/0054480.

Additionally, many mechanisms have been developed to cause an initial tilt of the cage assembly on these types of sprinklers with vertically-limited annular surfaces to prevent stalling on startup. One mechanism is to engage the tilting mechanism while running as seen in U.S. Pat. No. 7,770,821, however this can limit the life of the sprinkler because the tilting mechanism is constantly contacted and worn during operation. Another mechanism is to utilize a feature that initially tilts the cage or spool assembly when the sprinkler head is off, and is not contacted during full nutation as seen in U.S. Pat. Nos. 5,950,927; 6,176,440; 7,942,345; and 8,028,932. However, these mechanisms are limited either in the amount of initial tilt of the cage or spool, or in diminishing clearance between a static tilting mechanism and the moving parts of a fully nutating cage or spool as the annular surfaces begin to wear. This limitation is due to the annular surface resting on one of the limiting faces in addition to the tilting mechanism in the starting tilted position, and can only tilt a very limited amount before it contacts the other limiting annular surface. This limitation is believed by the inventors to be inherent in a sprinkler head that utilizes vertically limited annular surfaces.

What is needed is a sprinkler head with a nutating cage assembly having radially limited motion in which the geometry of the motion more naturally aligns the cage assembly's center of mass and center of motion so as to better minimize vibration, and also facilitates improved separation between the initial tilting mechanism and the cage or spool after initiation of nutation.

FIG. **5*a*** is a detail cross sectional view of a friction band of a spool assembly in the preferred embodiments of the sprinkler head in the start position.

FIG. **5*b*** is a detail cross sectional view of a friction band of a spool assembly in the preferred embodiments of a sprinkler head in the running position.

Figure 6:
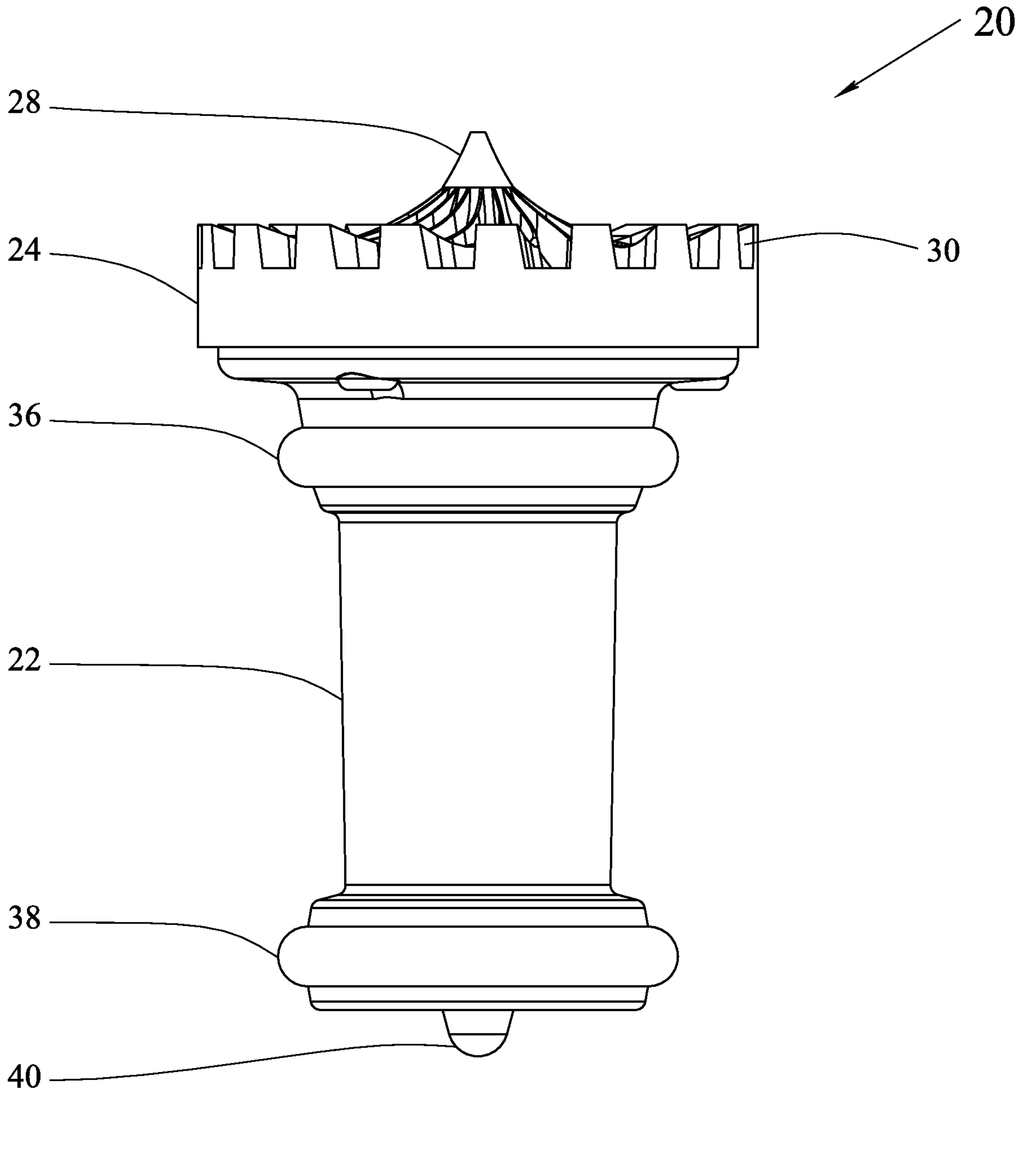

FIG. 6 is an elevation view of a first preferred embodiment of a spool assembly.

Figure 7:
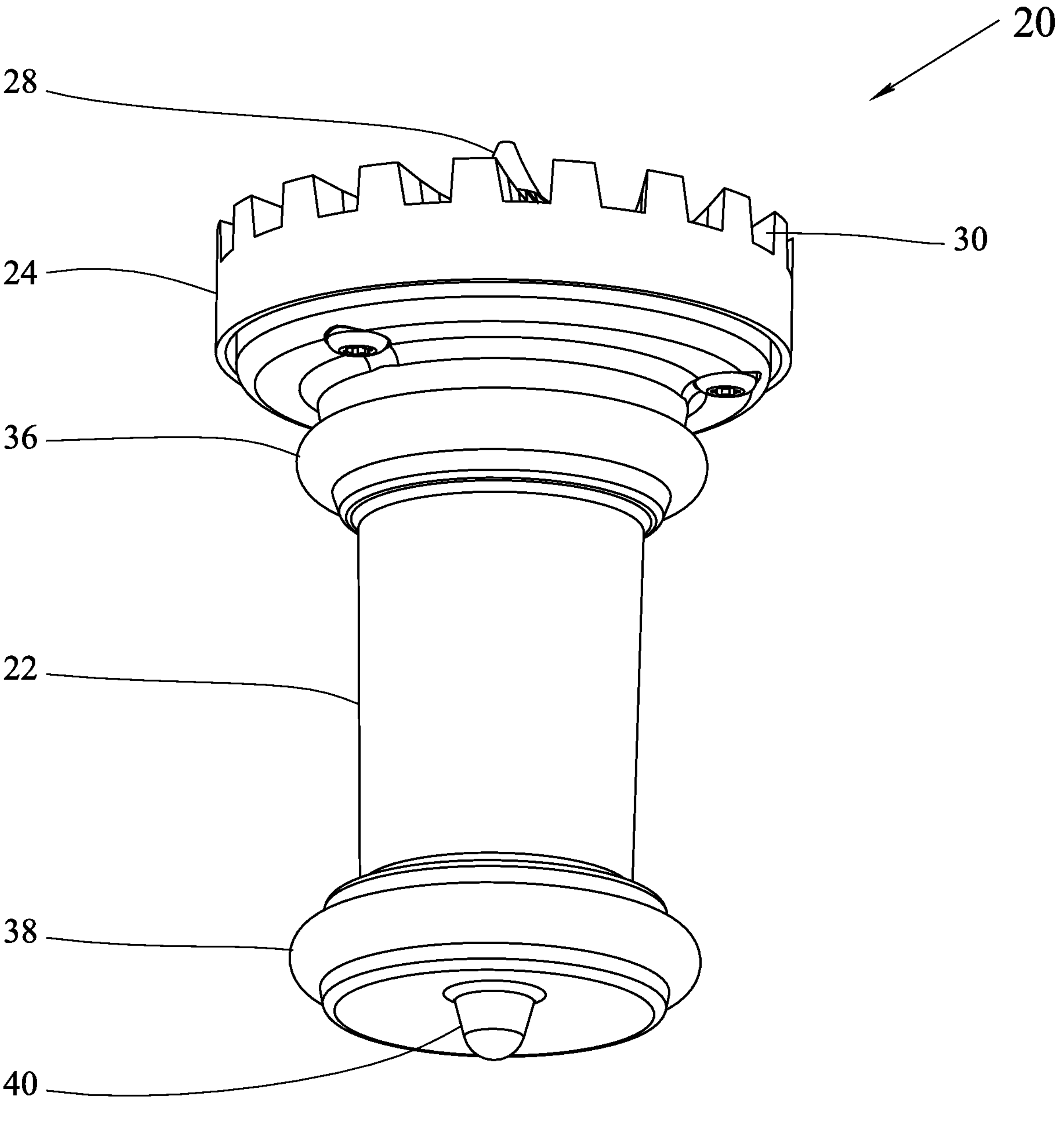

FIG. 7 is a perspective view of a first preferred embodiment of a spool assembly.

Figure 8:
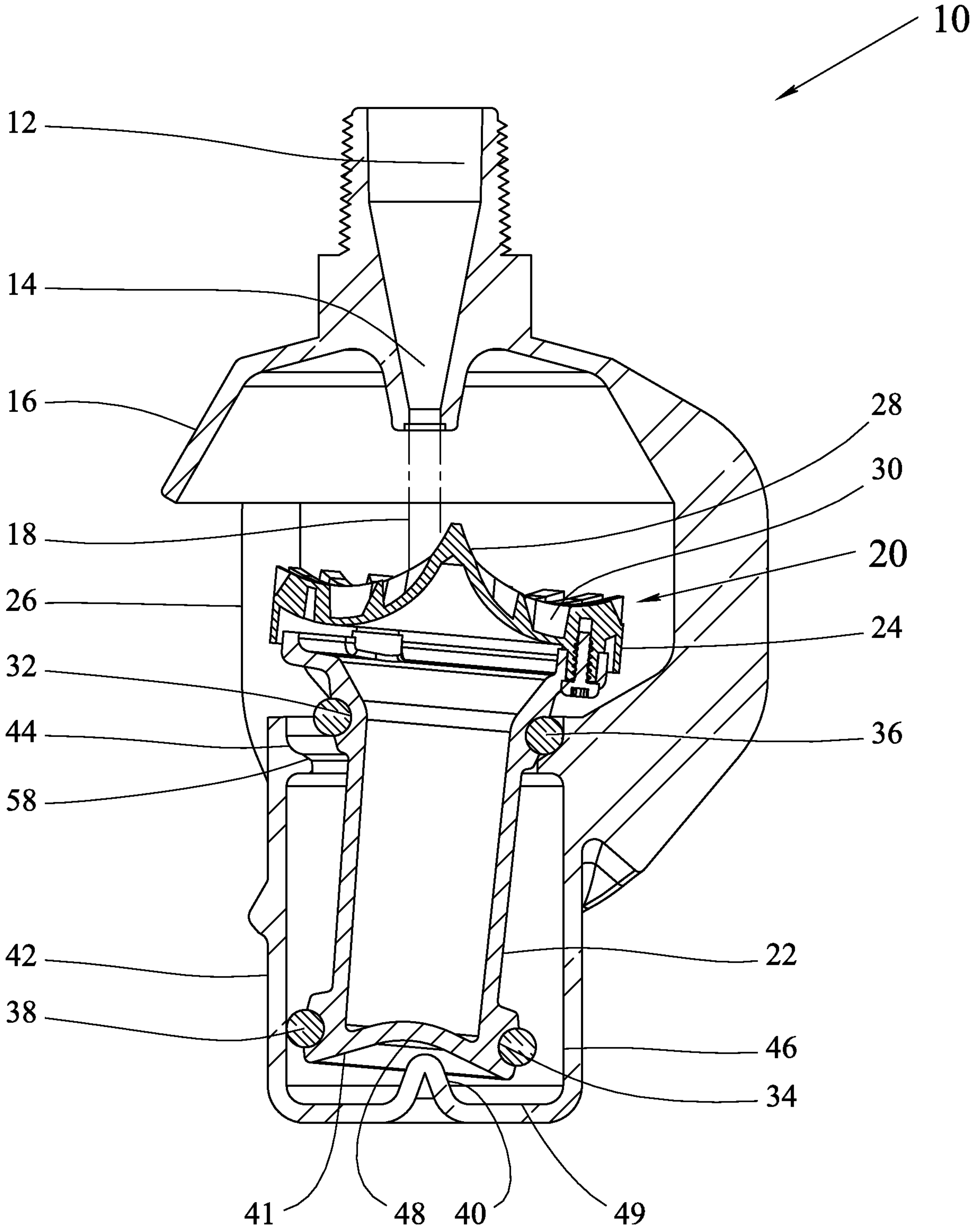

FIG. 8 is a cross sectional view of a second preferred embodiment of a sprinkler head in the on or running position.

Figure 9:
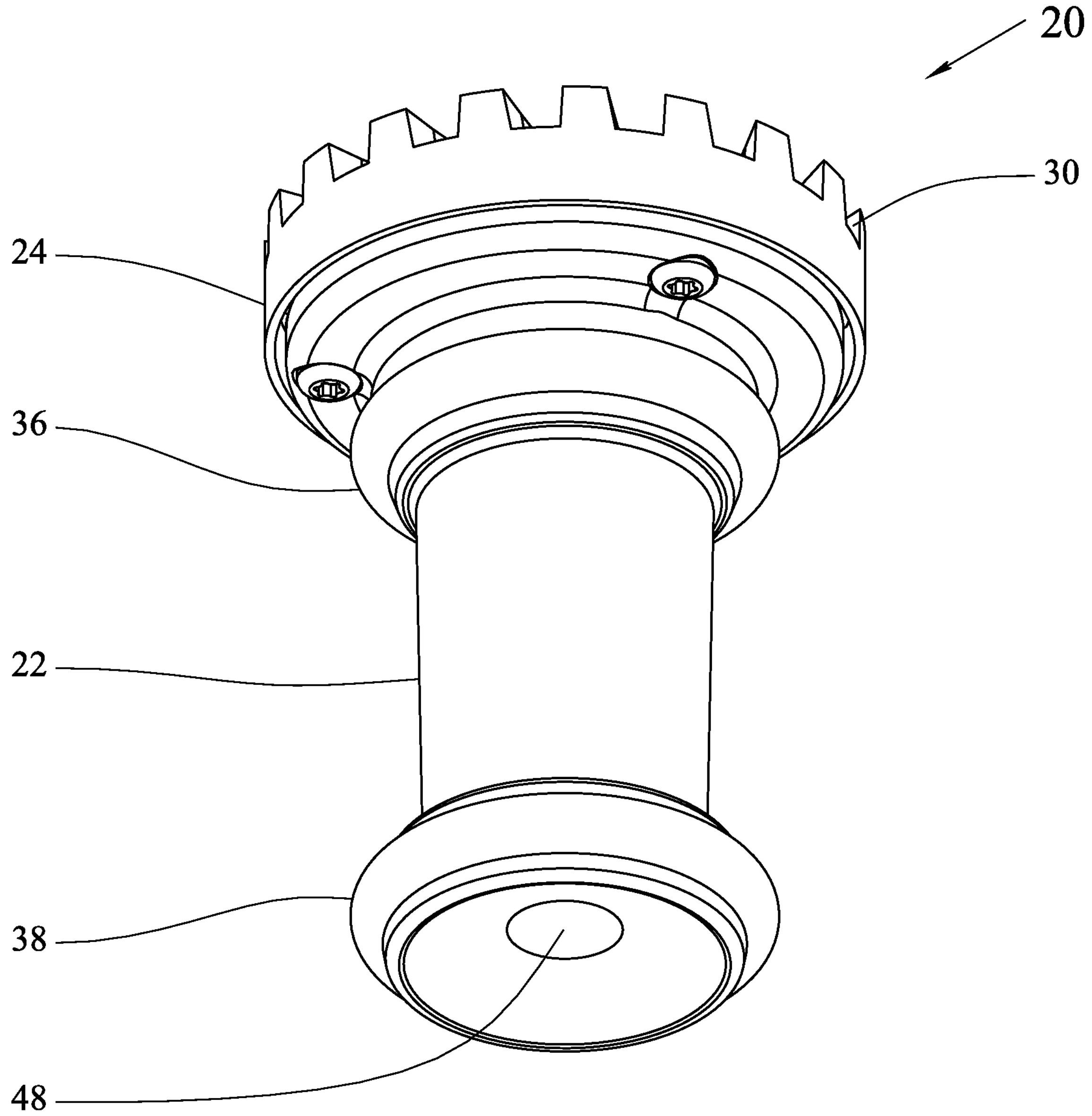

FIG. 9 is a perspective view of a preferred embodiment of a spool assembly.

Figure 10:
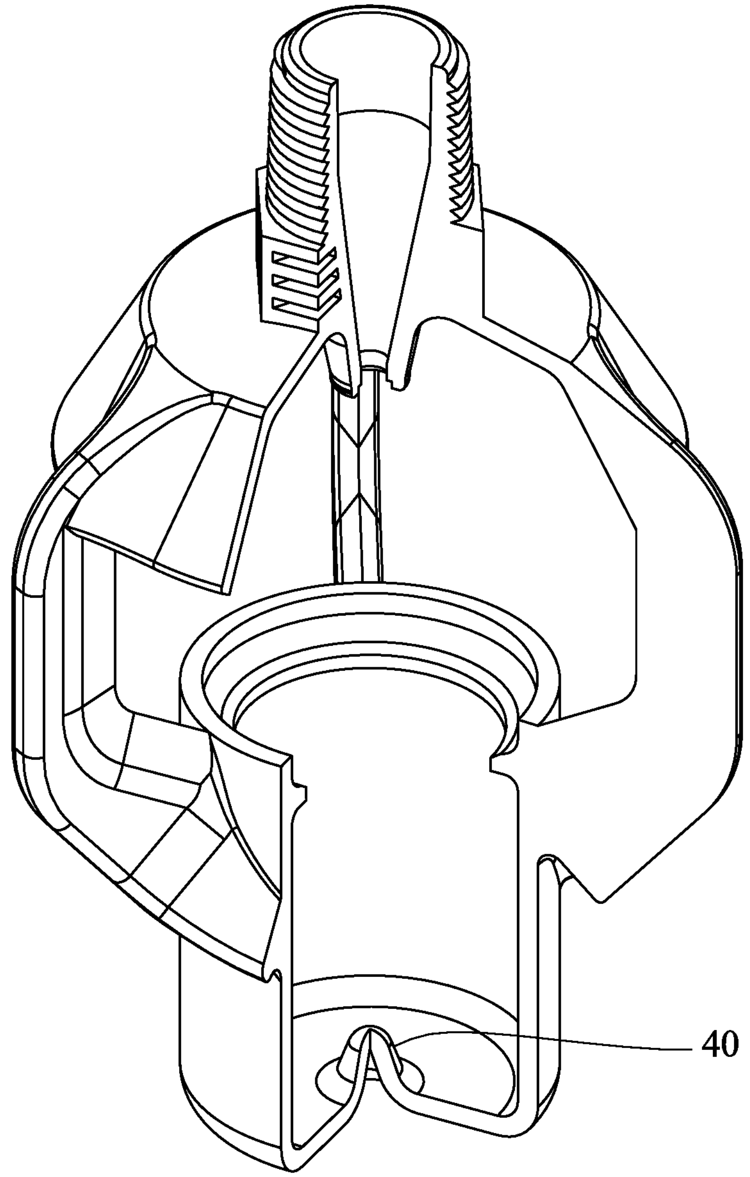

FIG. 10 is a perspective partial cutaway view of the body of a sprinkler head illustrated in FIG. 8.

Figure 11:
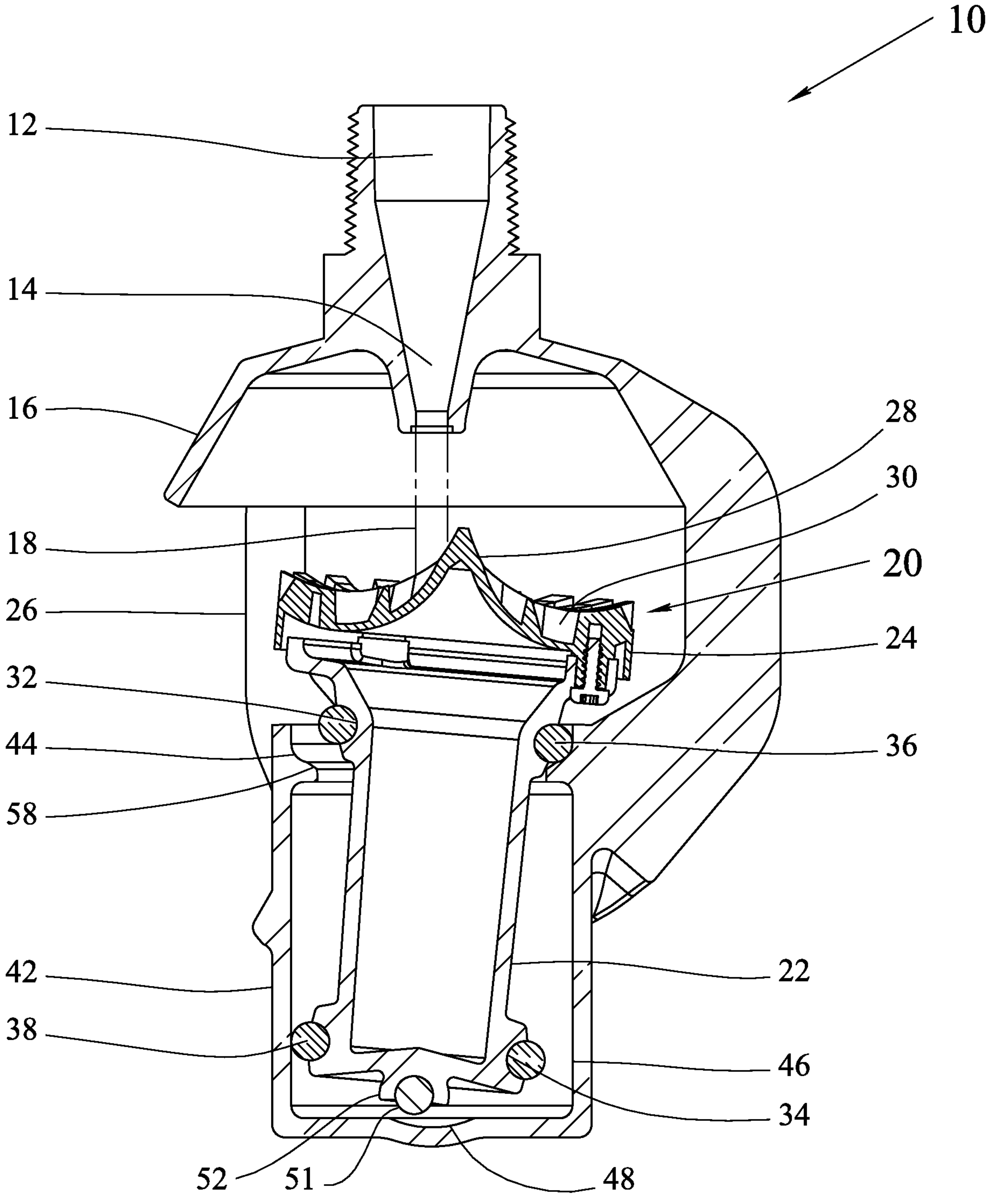

FIG. 11 is a cross sectional view of a third preferred embodiment of a sprinkler head in the on or running position.

Figure 12:
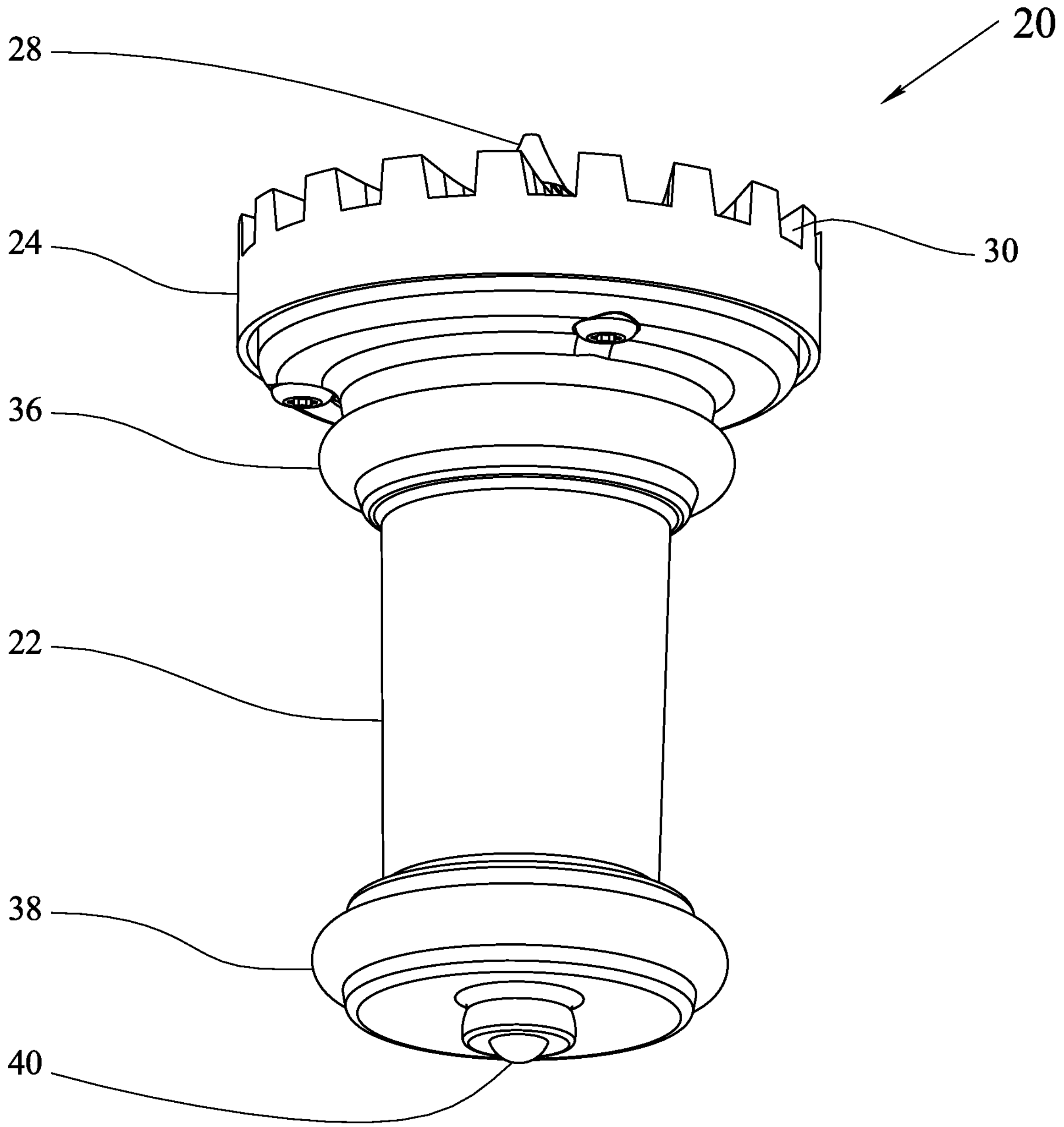

FIG. 12 is a perspective view of the third preferred embodiment of a spool assembly illustrated in FIG. 11.

Figure 13:
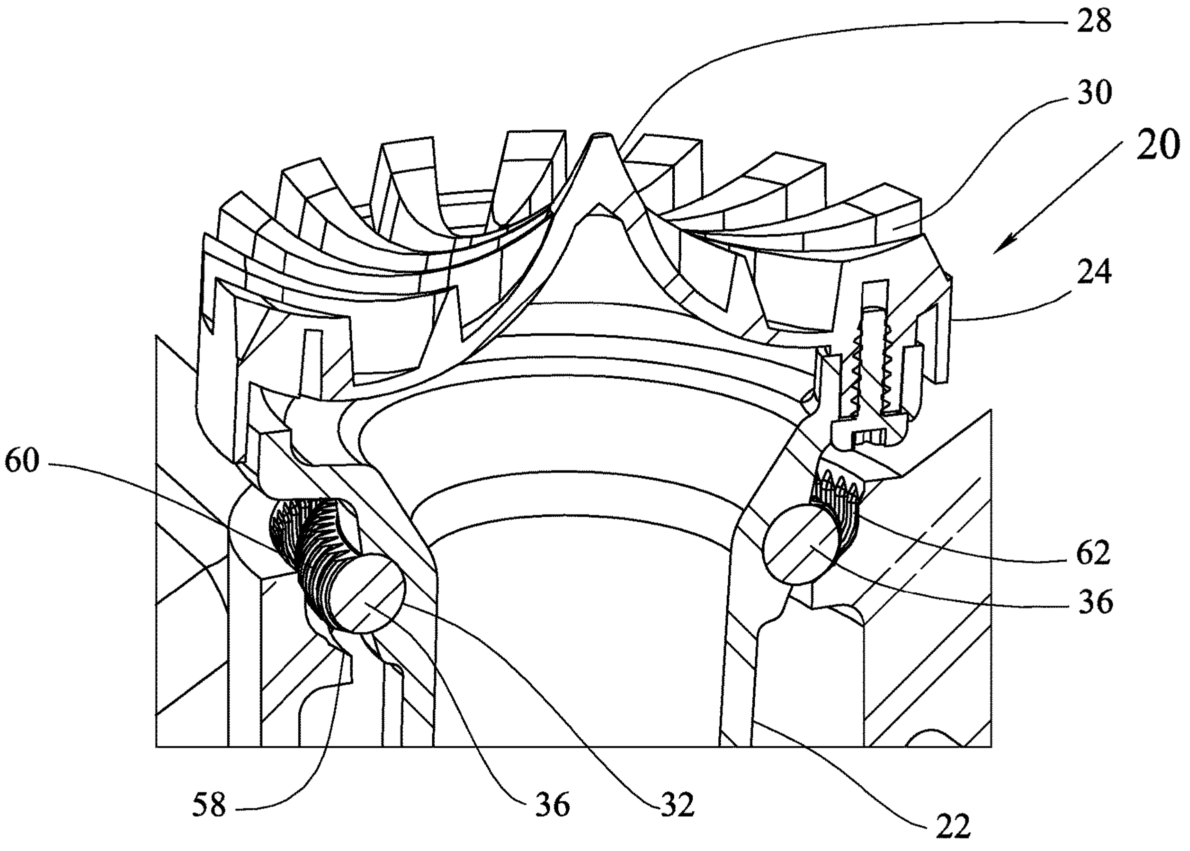

FIG. 13 is a cross sectional view of an embodiment of a sprinkler head having an upper friction band having gear teeth and the upper race comprising corresponding gear projections.

Figure 14:
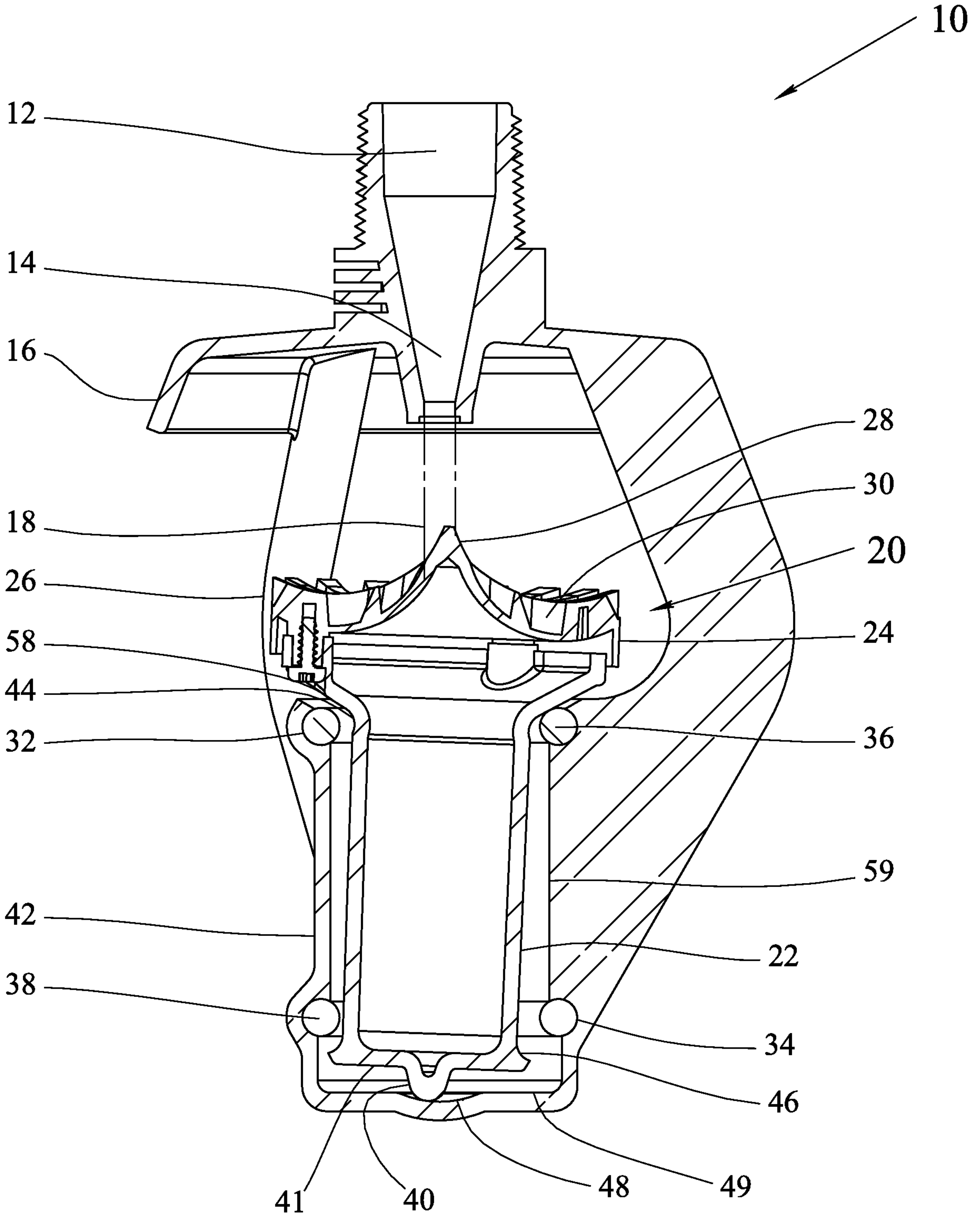

FIG. 14 is a cross sectional view of an embodiment of a sprinkler head in the off position having an upper friction band and lower friction band positioned on an inner wall of the lower sprinkler body.

Figure 15:
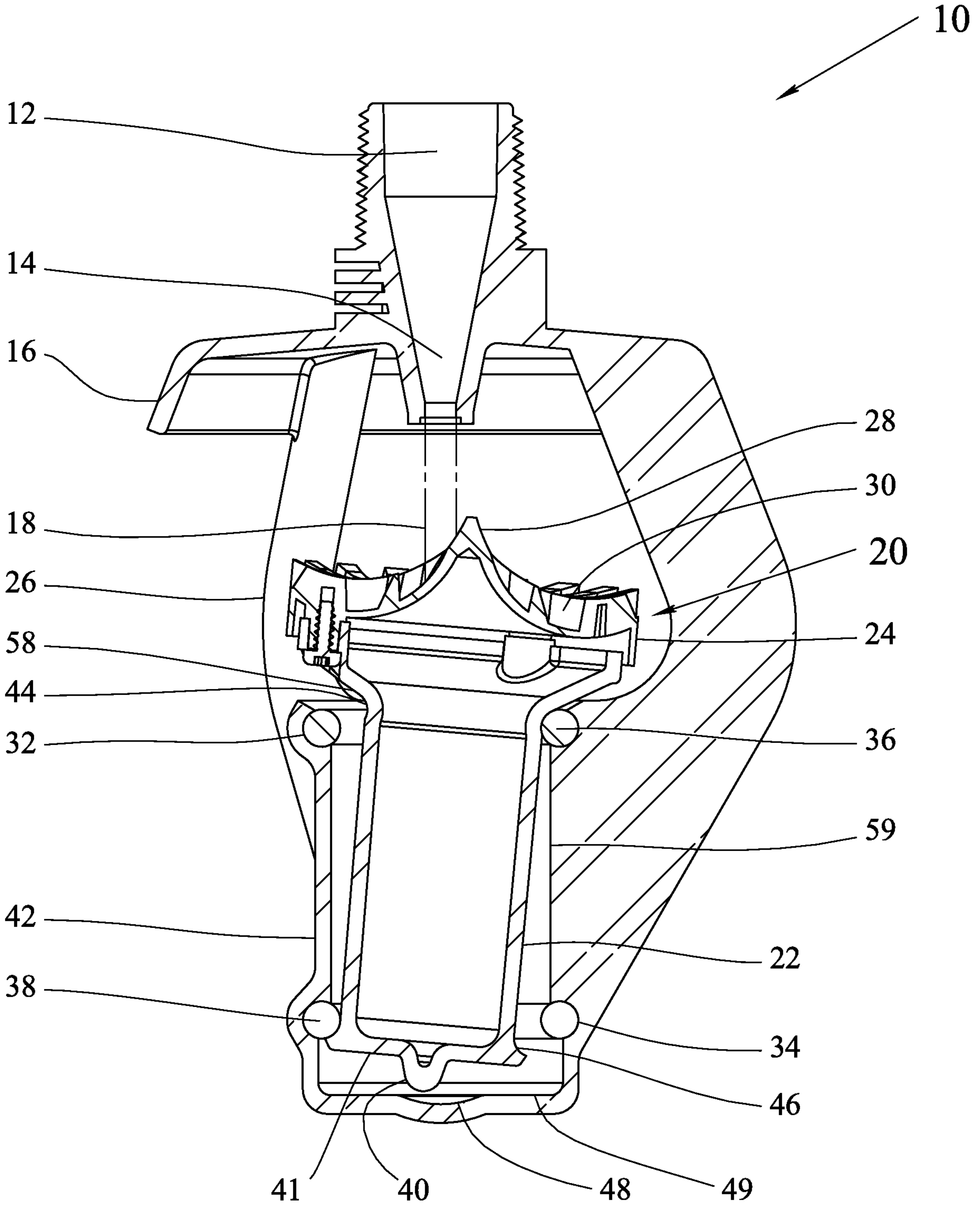

FIG. 15 is a cross sectional view of an embodiment of a sprinkler head in the on or running position having an upper friction band and lower friction band positioned on an inner wall of the lower sprinkler body.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

Disclosed is a fluid distributing sprinkler head that has a sprinkler body and a spool assembly configured to nutate within the sprinkler body. The sprinkler body includes an upper sprinkler body and a lower sprinkler body. The lower sprinkler body partially encloses a spool assembly. The spool assembly includes a spool body having an upper end and a lower end. The spool body has a distribution disc attached or formed at the upper end of the spool body. The distribution disc has a generally peaked surface incised by spirally radiating grooves. The spirally radiating grooves are configured to cause the spool assembly to nutate within the lower sprinkler body when impinged upon by fluid directed by the nozzle.

The upper sprinkler body preferably partially encloses a fluid delivery tube that supplies fluid to the nozzle, although varying nozzle arrangements can be utilized without varying from the scope of the invention. Fluid flows through the fluid delivery tube and exits out the nozzle, which defines a fluid path by constricting the supplied fluid to form a narrow stream of fluid. The nozzle is preferably removable from the sprinkler head so as to be replaceable. Preferably a variety of nozzle sizes can be utilized with the sprinkler head.

The upper sprinkler body and lower sprinkler body are preferably connected by one or more arms. The upper sprinkler body and lower sprinkler body are positioned relative to one another such that fluid sprayed from the nozzle in or above the upper sprinkler body is sprayed onto the distribution disc of the spool assembly positioned in the lower sprinkler body. The lower sprinkler body defines a cylindrical void configured to house the spool assembly. In a preferred embodiment the spool body has a generally cylindrical shape and is configured to be positioned within the lower sprinkler body. The cylindrical shape can be an hourglass shape, or other shape such as a rod spanning that is positioned at least partially within the lower sprinkler body.

The sprinkler head has a pair of spaced apart friction bands positioned on either the spool assembly or on an inner surface of the lower sprinkler body. The friction bands are called the upper friction band and lower friction band. In some preferred embodiment the upper friction band and lower friction band circumvolve the spool assembly. In these embodiments the upper and lower friction bands can be removably connected to annular profiles on the spool assembly so as to be replaceable, or they can be integrally molded or connected to the spool assembly. Preferably the friction bands are wearable friction bands. The friction bands can be constructed, for example, of a urethane material, rubber, hard plastic, or any material that would serve as a friction band.

In an alternate preferred embodiment the friction bands are configured on the inner surface of the lower sprinkler body. The friction bands can be integrally formed in the inner surface of the lower sprinkler body or removably connected to the inner surface of the lower sprinkler body.

An upper race and a lower race for rolling engagement with the upper and lower friction bands respectively is positioned or formed either in the inner surface of the lower sprinkler body or the outer surface of the spool assembly, depending on placement of the upper and lower friction bands.

As the spool assembly nutates, the races of the embodiments having the friction bands on the spool assembly are configured such that the outer diameter of each friction band rolls radially on the inner diameter of the races to limit the angle at which the spool assembly nutates. The outer diameter of each friction band is referred to as being the diameter through the center of the spool on which the friction band is located to the outermost perimeter of the friction band. The inner diameter of each race is the diameter measured through a center of the sprinkler body. Preferably the ratio of the upper friction band outer diameter to the upper race inner diameter is the same as the lower friction band outer diameter to the lower race inner diameter to allow both friction bands to roll without forcing one or the other to slip or scrub on the race. In contrast, when the friction bands are positioned on the inner surface of the lower sprinkler body, the outer diameter of the each race is configured to radially roll on the inner diameter of its associated friction band.

The upper friction band and lower friction band are preferably positioned within annular profiles positioned either radially at distal ends of the spool body at or near the top and bottom of the spool assembly in which the friction bands are positioned, or alternatively on the inner surface of the lower spool body.

The lower sprinkler body is preferably connected by one or more arms to the upper sprinkler body and partially circumvolves the spool assembly. The lower sprinkler body is removably connected via the arm(s) to the upper sprinkler body for maintenance or repair. In another preferred embodiment the lower sprinkler body is fixedly connected via the arms to the upper sprinkler body. In a further preferred embodiment the upper sprinkler body and the lower sprinkler body are integrally formed.

In a preferred embodiment the upper and lower friction bands have a circular cross-section, for example as in an O-ring. In another preferred embodiment the upper and lower friction bands have a non-circular cross-section so as to prevent the friction band from rolling or twisting within the spool's annular profile. In a further preferred embodiment one or both of the friction bands can have gear teeth, and one or both of the races can have opposing gear teeth to prevent slipping between the friction bands and the races.

In a preferred embodiment the outer diameters of the upper and lower friction bands are equal. The spool assembly can have a counterbalance weight attached to the bottom of the spool, and the spool assembly can have weight-reducing features to further align the spool assembly's center of rotation and center of mass to minimize vibration.

The spool assembly is configured to rest in a tilted position within said sprinkler body when said sprinkler head is not running This initial tilt prevents the fluid sprayed from the nozzle from hitting in the center of the distribution disc which could cause the spool assembly to stall on startup.

Preferably the initial tilt is caused by one of the spool lower end and an inner surface of the lower end of sprinkler body being configured with a rounded projection, wherein the other of the spool lower end and the inner surface of the lower end of said sprinkler body is configured with a cup. The rounded projection is configured to be positioned in the cup when the sprinkler head is not running causing the spool assembly to rest in a tilted position when said sprinkler head is not running. In other words, the positioning of the rounded projection and the cup can be reversed.

The rounded projection can be integrally formed in either of the lower sprinkler body or the spool assembly, or can be attached in either position. In a further preferred embodiment the rounded projection is constructed of a ball bearing positioned within a ball bearing support cup. The ball bearing rolls in the cup, allowing the lower end of the spool assembly to move while reducing wear on the cup and the lower end of the spool assembly.

In a preferred embodiment one or both of the upper and lower races has a starter ramp configured as part of the race or extending from the race. When the sprinkler head is without fluid the spool assembly is in a titled orientation with the upper friction band partially contacting the upper race. As the sprinkler turns on and begins to impinge fluid on the distribution disc, the spool assembly begins to tilt and rotate contacting the lower friction band with the lower race. This is called the starting position. As the spool assembly begins to nutate faster the centrifugal force of the spool assembly drives the friction band up the starter ramp of until it contacts the race. When the friction band(s) has reached its race it radially rolls in the race as the sprinkler operates is in the running position.

A starter ramp can be positioned on or extending from the upper race, the lower race, or both. As used herein the starter ramp extending from the lower race or being configured as part of the race are used interchangeably, with any starter ramp that is configured to allow a friction band to move vertically into the running position of the race is in accordance with the inventive concepts disclosed herein.

Because the friction bands load on the races radially, the starter ramp is able to lift the spool assembly upward thus lifting the lower end of the spool assembly away from the inner surface of the lower end of the lower sprinkler body. This allows for clearance between the rounded projection and the cup.

In a preferred embodiment, one or both of the upper and lower races can have an upper-limiting face. The upper-limiting face limits the amount the spool assembly can lift while the sprinkler head is running. This serves to maintain the friction bands on their respective races when the sprinkler head is running.

The sprinkler head can have an optional weight, with a purpose of the weight being to dampen vibrations caused by nutation of the spool assembly and to help prevent wind from blowing the sprinkler head away from vertical when hung on flexible conduit.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE EXEMPLARY EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 1:
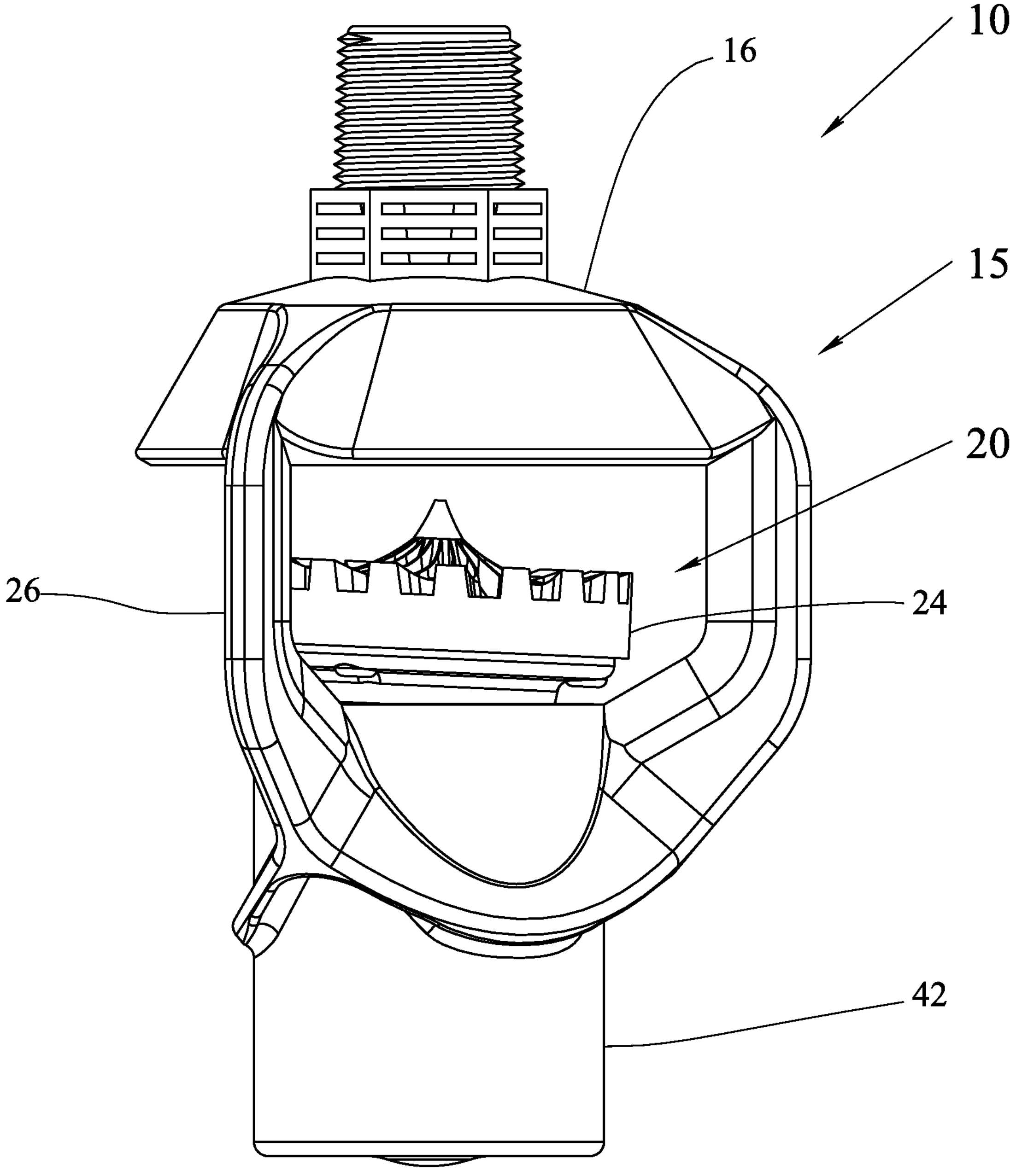
FIG. 1 is an elevation view of a first preferred embodiment of a sprinkler head.

A preferred embodiment of the disclosed technology is shown FIGS. 1 through 7. FIG. 1 shows the disclosed sprinkler head in what is called a vertical orientation, as regards parts with a "top" side or a "bottom" side.

Figure 2:
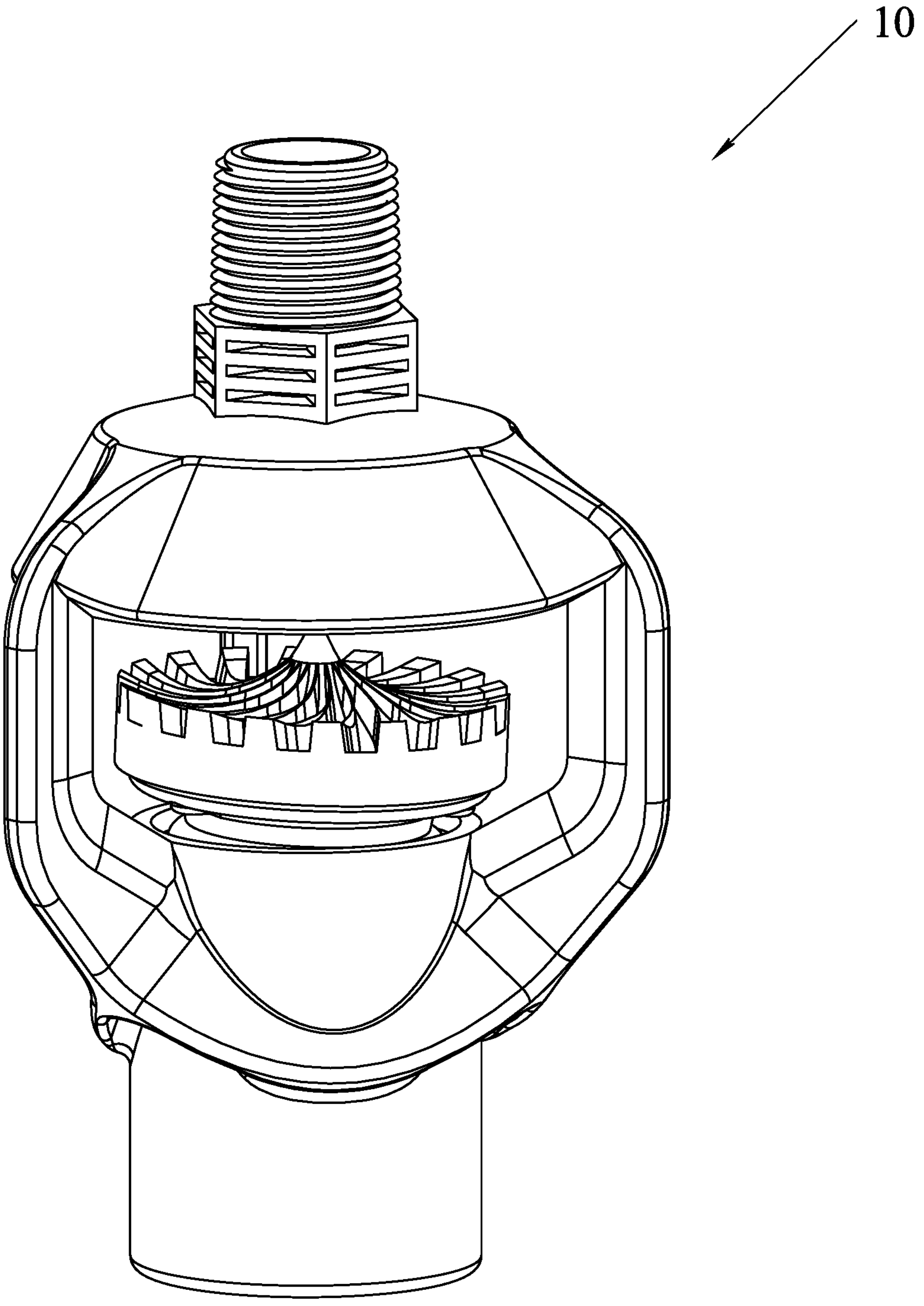
FIG. 2 is a perspective view of a first embodiment of a sprinkler head.

FIG. 1 illustrates a sprinkler head 10 in an elevational view. The sprinkler head has a sprinkler body 15 housing a spool assembly 20. The sprinkler head is in an off position with the spool assembly supported at an angle relative to the lower sprinkler body. The sprinkler body includes an upper sprinkler body 16 connected to a lower sprinkler body 42 by one or more arms 26. The spool assembly 20 is housed in the lower sprinkler body 42. The spool assembly has a distribution disc 24 positioned at the top of the spool assembly. The upper sprinkler body is configured to connect to an external fluid supply at the top of the sprinkler body. The irrigation water supply enters at the upper opening of the sprinkler body and sprays through the nozzle and impinges the surface of the distribution disc of the spool assembly causing the spool assembly to nutate within the lower sprinkler body and distribute the irrigation water sprayed onto the distribution disc. FIG. 2 illustrates a perspective view of the sprinkler head of FIG. 1.

Figure 3:
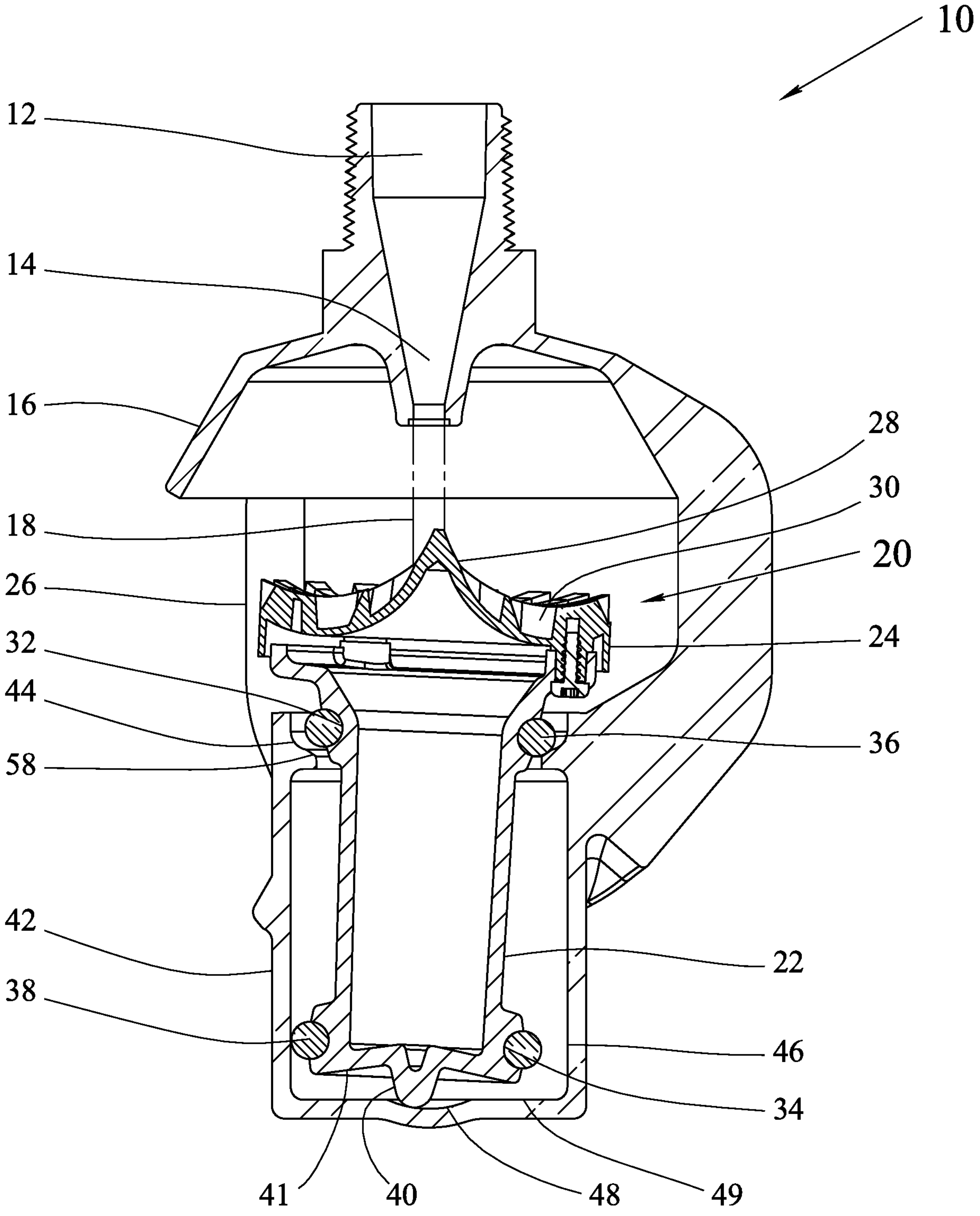
FIG. 3 is a cross sectional view of a first preferred embodiment of a sprinkler head in the off position.

FIG. 3 is a cross-sectional view of the embodiment of the sprinkler head illustrated in FIG. 1. The sprinkler head is shown in an off position. The sprinkler head has a fluid delivery tube 12 attached to the sprinkler body 15. The fluid delivery tube delivers fluid to a nozzle 14 positioned at the end of the fluid delivery tube in the sprinkler body 15. In the depicted embodiment the sprinkler body is formed in two connected sections, the upper sprinkler body 16 and the lower sprinkler body 42. The nozzle is configured to direct a spray of fluid at a distribution disc 24. The nozzle is configured to direct the spray of fluid along a fluid trajectory path 18 through the upper sprinkler body 16. A sprinkler weight (not illustrated) can be added to the sprinkler body. The sprinkler weight can be made of a variety of materials, including metal, glass, or plastic filled with weighted material with a weight-providing material like sand, or other material known or to be known to those skilled in that art.

The lower sprinkler body 42 is connected to the upper sprinkler body by one or more arms 26, with the depicted embodiment utilizing three arms. The lower sprinkler body partially houses a spool assembly 20. The spool assembly includes a spool body 22 that is attached to or integral with a distribution disc 24. In a preferred embodiment the spool assembly has a generally cylindrical shape with a spool body upper end attached to or integral with the distribution disc. The spool body extends into the lower sprinkler body. The spool assembly is configured to rest at an angle relative to the lower sprinkler body when the sprinkler is not running (also called in the off position). FIG. 3 further illustrates a preferred embodiment of rounded projection 40 extending from the lower end of the spool body. The rounded projection 40 is configured to rest within a cup 48 formed in the inner surface 49 of the lower end of the lower sprinkler body. The configuration of the rounded projection and the cup can be reversed, with the rounded projection extending upward from the inner surface of the lower end of the lower sprinkler body.

The spool assembly has an upper friction band 36 and a lower friction band 38 positioned at or near opposing distal ends of the spool body. The upper friction band is positioned within an upper annular profile 32 configured on an outer surface of the spool body. The lower friction band is configured within a lower annular profile 34 configured in an outer surface of the spool body. The spool assembly is configured to rest with the rounded projection 40 in the cup 48 of the inner surface of the lower sprinkler body such that the spool assembly is tilted such that the upper friction band is positioned against the lower end of a starter ramp 58.

The distribution disc has a generally peaked surface 28 from which spirally radiating grooves 30 extend outward. As fluid is sprayed from the nozzle onto the distribution disc, the fluid flows out one or more of the spirally radiating grooves, causing the spool assembly to tilt and rotate. As the spool assembly tilts and rotates, the upper friction band moves upward along the sloped starting ramp 58 into the upper race 44 and the lower friction band moves upward into a lower race 46.

Figure 4:
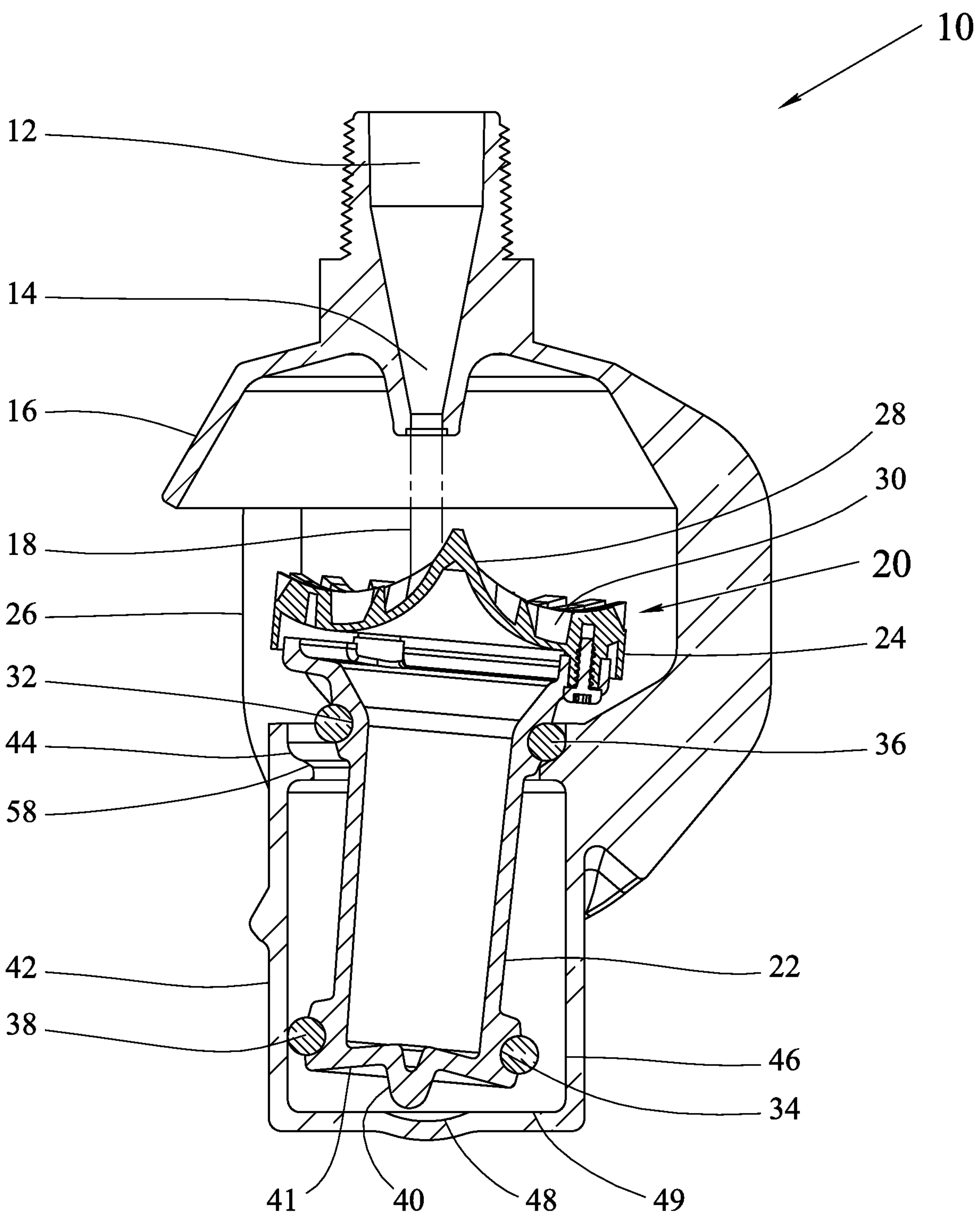
FIG. 4 is a cross sectional view of a first preferred embodiment of a sprinkler head in the on or running position.

FIG. 4 illustrates the embodiment of a sprinkler head depicted in FIGS. 1-3 in a running position. The spool assembly has rotated upward along the starter ramp into the running position. In the running or on position, nutation of the spool assembly occurs as fluid is sprayed from the nozzle 14 onto the distribution disc 24 via flow fluid trajectory path 18. The upper friction band 36 and lower friction band 38 are radially rolling within or on their respective races. The upper friction band is configured such that as the spool assembly nutates within the sprinkler body, the outer diameter of the upper friction band rolls radially on the inner diameter of the upper race to limit the angle at which the spool assembly nutates. Similarly, the lower race is configured to limit the angle at which the spool assembly nutates by the outer diameter of the lower friction band rolling radially on the inner diameter of the lower race.

Figure 5A:
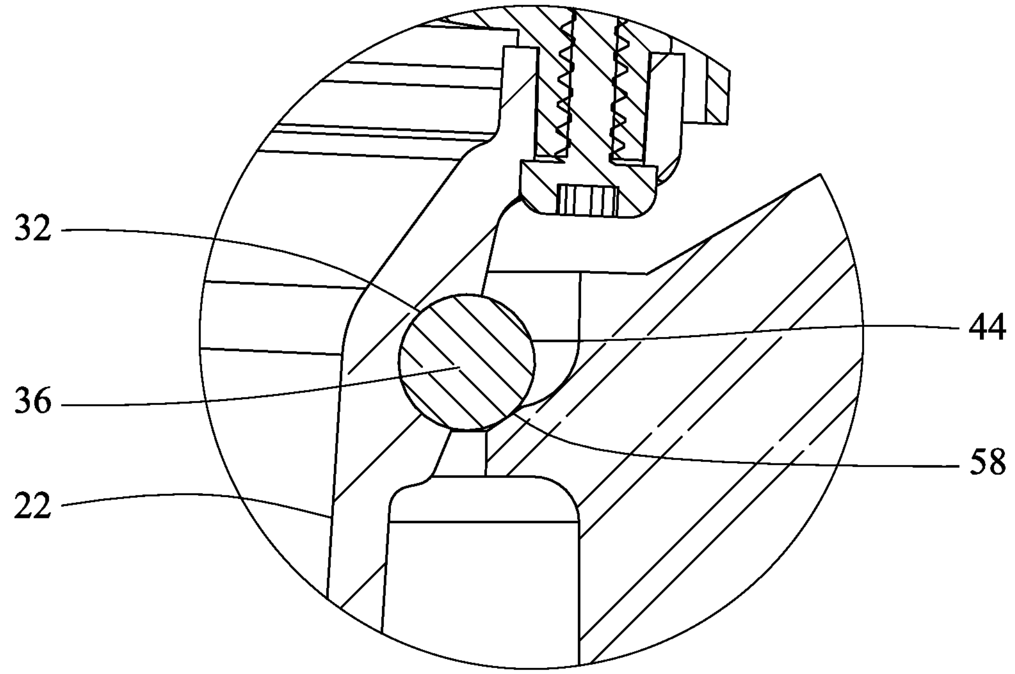
Figure 5B:
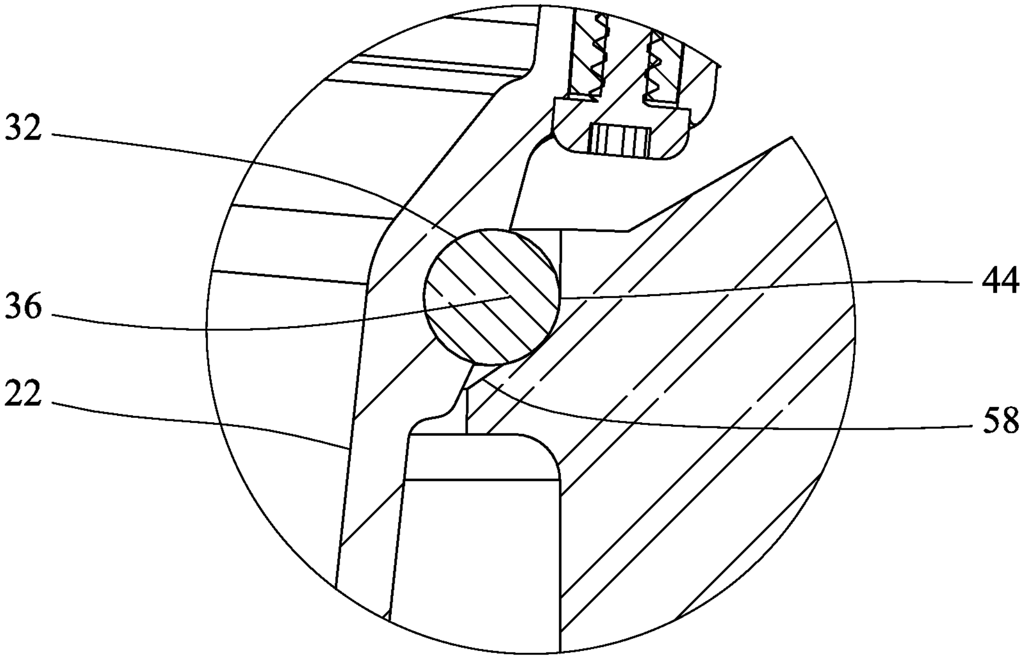

FIGS. 5A and 5B illustrate cross-sectional views of the interaction between the upper friction band and the upper race of the sprinkler body of the embodiment of a sprinkler head shown in FIGS. 1-4. FIG. 5A illustrates a cross-sectional view of a friction band in the start position. In the start position, the upper wearable friction band is resting against a starter ramp of the upper race. The starter ramp extends from the upper race and is configured such that the upper friction band drives up the starter ramp and into the upper race as nutation of the spool assembly escalates. FIG. 5B illustrates the upper friction band 36 and upper race when the sprinkler head is in the running position. The upper friction band has moved upward into the upper race of the internal surface of the sprinkler body. The upper friction band continues radially rolling within the upper race as nutation and thus irrigation continues.

FIGS. 6 and 7 illustrates a preferred embodiment of a spool assembly 20 as shown in FIGS. 1-4. The depicted spool assembly has a generally cylindrically shaped spool body 22 attached to a distribution disc 24 at the upper end of the spool body. The distribution disc 24 has a generally peaked surface 28 with spirally radiating grooves 30 extending outward from the peak to the edge of the distribution disc.

FIGS. 8-10 illustrate an alternate preferred embodiment to the embodiment illustrated in FIGS. 1-4 and 6. In FIGS. 8-10 the rounded projection 40 and corresponding cup 48 have been reversed, with the rounded projection extending upward from the lower inner surface of the lower sprinkler body. The cup 48 is positioned in the lower end of the spool body. In an off position the cup of the lower end of the spool body rests against the rounded projection causing the spool assembly to rest at a tilted angle with the upper friction band resting against the starter ramp of the upper race.

FIGS. 11 and 12 illustrate a third preferred embodiment of a sprinkler head. In FIGS. 11 and 12, the rounded projection is configured as a ball bearing 51 positioned in a ball bearing support cup 52. The ball bearing is configured to roll on the cup 48 of the inner surface of the lower end of the lower sprinkler body. Alternatively the cup 48 and rounded projection configured as a ball bearing and ball bearing support cup can be reversed, with the rounded projection extending from the inner surface of the lower end of the lower sprinkler body.

FIG. 13 illustrates an alternate embodiment of a sprinkler head in which the upper friction band 36 has gear teeth that are configured to interact with gear teeth 62 configure in the upper race.

FIG. 14 illustrates an embodiment of a sprinkler head in which the upper friction band 36 and lower friction band 38 are configured on the inner surface 59 of the lower sprinkler body 42. The sprinkler head is in the off position with the rounded projection 40 resting in the cup 48. The upper friction band 36 is illustrated in an upper annular profile 32 while the lower friction band 38 is positioned within the lower annular profile 34 formed in the inner surface 59 of the lower sprinkler body 42. The upper race 44 and associated starter ramp 58 are configured in the outer surface of the spool body near the upper end of the spool assembly. The lower race 46 is configured near the lower end of the spool assembly.

FIG. 15 illustrates the embodiment of a sprinkler head of FIG. 14 in the on or running position. The spool assembly has rotated upward such that the upper race formed in the outer surface of the spool body is rolling on the upper friction band. The lower race is rolling on the lower friction band.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

The invention claimed is:

1. A fluid distributing sprinkler head, comprising, a fluid delivery tube in fluid connection with a nozzle;

a sprinkler body comprising an upper sprinkler body and a lower sprinkler body, said upper sprinkler body partially enclosing said fluid delivery tube and nozzle;

a spool assembly positioned within said lower sprinkler body, said spool assembly comprising, a spool body, said spool body comprising a spool body upper end and a spool body lower end;

a distribution disc connected to said spool body upper end, wherein said nozzle is configured to direct fluid via a fluid path onto said distribution disc, said distribution disc having a peaked surface, said peaked surface incised by spirally radiating grooves, said spirally radiating grooves configured to cause said spool assembly to nutate within said lower sprinkler body when impinged upon by fluid directed by said nozzle;

wherein one of said spool assembly and an inner surface of said lower sprinkler body comprises an upper friction band having an upper friction band outer diameter, wherein the other of said inner surface of said lower sprinkler body and said spool assembly comprising an upper race configured for rolling engagement with said upper friction band outer diameter, wherein one of said spool assembly and said inner surface of said lower sprinkler body comprises a lower friction band having a lower friction band outer diameter, wherein the other of said inner surface of said lower sprinkler body and said spool assembly comprising a lower race configured for rolling engagement with said lower friction band outer diameter;

wherein at least one of said upper race and said lower race comprises a starter ramp, wherein said starter ramp is configured such that said starter ramp is in contact with one of said upper friction band or said lower friction band a lower end of said starter ramp when said sprinkler head is not running, wherein said sprinkler head is configured such that upon start up of fluid spraying on said distribution disc generating centrifugal force on said spool assembly said spool assembly is driven upward causing the upper friction band and/or said lower friction band to move up said starter ramp into the respective race or by driving the starter ramp up said upper friction band or said lower friction band until said upper friction band is in rolling engagement with said upper race and said lower friction band is in rolling engagement with said lower race;

wherein said upper friction band and said lower friction band are spaced apart such that said upper friction band is configured for radially rolling engagement on an inner diameter of said upper race when said spool assembly is nutating within said lower sprinkler body and said lower friction band is configured for radially rolling engagement on said lower race when said spool assembly is nutating within said lower sprinkler body; and wherein said spool assembly is configured to rest in a tilted position within said sprinkler body such that said starter ramp of at least one of said lower race and said upper race is in resting engagement with one of said upper friction band and said lower friction band when said sprinkler head is not running.

2. The sprinkler head of claim 1, wherein said upper friction band and said lower friction band are configured on said spool, wherein said upper race and said lower race are configured on said inner surface of said lower sprinkler body.

3. The sprinkler head of claim 2, wherein said upper friction band circumvolves said spool assembly at an upper annular profile, wherein said lower friction band circumvolves said spool assembly at a lower annular profile.

4. The sprinkler head of claim 2, wherein said upper friction band and said lower friction band each are removably attached to said spool assembly.

5. The sprinkler head of claim 1 wherein one of said spool body lower end and an inner surface of a lower end of said lower sprinkler body is configured with a rounded projection, wherein the other of said spool body lower end and said inner surface of said lower end of said lower sprinkler body is configured with a cup, wherein said rounded projection is configured to be positioned in said cup when said sprinkler head is not running causing said spool assembly to rest in a tilted position when said sprinkler head is not running.

6. The sprinkler head of claim 5, wherein said rounded projection comprises a ball bearing positioned within a ball bearing support cup.

7. The sprinkler head of claim 1, wherein said lower sprinkler body and said upper sprinkler body are connected by at least one arm.

8. The sprinkler head of claim 7, wherein said lower sprinkler body and said upper sprinkler body are removably connected.

9. The sprinkler head of claim 1, wherein at least one of said upper friction band and said lower friction band has a circular cross-section.

10. The sprinkler head of claim 1, wherein at least one of said upper friction band and said lower friction band comprises friction band gear teeth, wherein at least one of said upper race and said lower race comprises race gear teeth, wherein said race gear teeth and said friction band gear teeth are configured to be opposing, wherein said gear teeth are configured to prevent slipping as said spool assembly nutates.

11. The sprinkler head of claim 1, wherein said upper friction band outer diameter and said lower friction band outer diameter are equal.

12. The sprinkler head of claim 1, wherein said upper friction band and said lower friction band are configured on said inner wall of said lower sprinkler body, wherein said upper race and said lower race are configured on said spool.

* * * * *